United States Patent Office 3,322,630
Patented May 30, 1967

3,322,630
METHOD OF POTENTIATING CATECHOLAMINE DEPLETION
Curt C. Porter, Glenside, Pa., assignor to Merck & Co., Inc., Rahway, N.J., a corporation of New Jersey
No Drawing. Filed June 30, 1965, Ser. No. 468,631
7 Claims. (Cl. 167—65)

This invention relates to new compositions for the depletion of catecholamines in various tissues. More specifically, this invention relates to a method of more effectively depleting catecholamines in mammalian tissues which comprises the coadministration of at least 30 mg./kg., based on the body weight of the mammal, of d-α-methyl-p-tyrosine and at least a minimal depleting dose, for the tissue to be depleted, of a catecholamine depleting compound selected from the group consisting of l or dl-α-methyl-m-tyrosine, l or dl-α-methyldopa and 2-(2,4,5-trihydroxyphenyl)ethylamine. More specifically also, this invention relates to a composition for depleting catecholamines in mammalian tissues which comprises:

(a) d-α-methyl-p-tyrosine;
(b) a catecholamine depleting compound selected from the group consisting of l or dl-α-methyl-3,4-dihydroxyphenylalanine, l or dl-α-methyl-m-tyrosine and 2-(2,4,5-trihydroxyphenyl)ethylamine;
(c) the said composition containing at least 30 mg. of said compound (a) and a minimal effective dose expressed in mg./kg. of the said compound (b).

The catecholamines such as dopamine, norepinephrine and adrenalin which are the end metabolites of the natural amino acid tyrosine are pressor substances. Depletion of various beneficial therapeutic treatments. Thus, a general depletion in both heart and brain as well as other nerve tissue is associated with a hypotensive activity. Selective depletion in the brain without depletion in the heart appears in some fashion to have some connection with tranquilizer activity. Certain compounds having the ability to deplete catecholamines in various tissues are available commercially for these uses as e.g., l-α-methyl-3,4-dihydroxyphenylalanine, methyldopa, or dl-α-methyl-3,4-dihydroxyphenylalanine. Other compounds such as α-methyl-m-tyrosine and 2-(2,4,5-trihydroxyphenyl)ethylamine or 6-hydroxydopamine are also known to have a strong activity in depleting catecholamines.

I have found that the closely related compound d-α-methyl-p-tyrosine has no effect on catecholamines in its own right, but that this compound strongly potentiates the depletion of catecholamines from various tissues by the three compounds named above. This potentiation is peculiar to the otherwise inactive d-form of α-methyl-p-tyrosine, the catecholamine depleting l-form of this compound having no such potentiating effect. The potentiation is furthermore peculiar to these particular catecholamine depletors, other materials with this property not being potentiated, as e.g., reserpine.

It is an advantage of my invention that it permits the accentuation of this important effect and thus permits the attainment of more effective depletion with a much lower dosage of the drug. It is a further advantage of this invention that it provides a research tool for the study of the relationship between catecholamines and pressor and tranquilizing effects.

In the method of my invention, I have found that it is necessary to administer at least 30 mg./kg. of the potentiating d-α-methyl-p-tyrosine and at least a minimal effective dose of the catecholamine depletor for the tissue to be studied. Because the $ED_{50}$ for various tissues varies widely, by means of this potentiation it is possible to run selective depletion in various tissues and study the effect of this depletion on other biological properties, a further advantage of my invention.

In the composition of my invention, one must have at least 30 mg. of d-α-methyl-p-tyrosine and at least a minimal effective amount of the catecholamine depletor for the tissue to be studied calculated on a per kg. body weight dose basis. So long as these minimums are observed any greater amounts can be present in the composition.

The $ED_{50}$ of a drug is the dose having 50% effectiveness. In the case of a catecholamine depletor it is the dose at which 50% of the catecholamine is depleted from the tissue. The dose response curve of a drug of this nature, when plotted with response as the ordinate and the logarithm of the dose as the abscissa, is a curve beginning close to zero and gradually growing steeper until the $ED_{50}$ is passed and then approaching 100% as an asymptote. When at least 30 mg. of d-α-methyl-p-tyrosine per kg. is coadministered with one of the three compounds mentioned above, the $ED_{50}$ for catecholamine depletion in the various tissues is dropped to one-half and even to one-third the value for the depletor alone. Furthermore, it is found that unless approximately 30 mg./kg. of d-α-methyl-p-tyrosine is used, potentiation is negligible. The composition and the method of this invention, therefore, specify that at least this quantity of the potentiator should be used.

The amount of the catecholamine depleting compound to be used is specified as at least a minimal effective dose when used alone. By this is meant a dose at which the dose response curve (as described in the preceding paragraph) is starting to rise and therefore some catecholamine depletion is being observed. Since the potentiation which is the essence of this invention causes a shift of the dose response curve toward lower doses without changing its shape, a minimal effective dose for the depletor alone immediately becomes a quite effective dose (usually well over 50% effective) when used with at least 30 mg./kg. of the d-α-methyl-p-tyrosine. The larger the amount of the latter compound, the more the depletion, with even the amount that alone is merely minimally effective, will approach 100%.

This invention can be illustrated by the following examples:

Example 1

Female albino mice (Carworth Farms, $CF_1$) weighing 18–22 grams were used. Compounds were injected intraperitoneally in aqueous solution, minimal amounts of hydrochloric acid being used to solubilize α-methyltyrosine. Dosing was on a body weight basis: mg. base per kg.

A. Determination of tissue catecholamines.—Tissues were homogenized in dry n-butanol and the catecholamines were back-extracted into dilute HCl (or buffer) as described in the literature (C. C. Porter, J. A. Totaro and C. A. Leiby, J. Pharmacol. Exp. Therap. 134, 139 (1961)). For the simultaneous determination of norepinephrine and dopamine, the trihydroxyindole method (U.S. von Euler and I. Floding, Acta Physiol. Scand. 33, Suppl. 118, 57, (1955)) was modified as follows: To 1 ml. of catecholamine solution in 0.1 M phosphate buffer, pH 6.5, are added 0.5 ml. of 4% versene, 0.2 ml. of iodine solution (0.254 g. $L_2$ and 0.48 g. KL in 100 ml.), 0.25 ml. alkaline sulfite (1.26 g. anh. $Na_2SO_3$ in 10 ml. water diluted to 50 ml. with 5 N NaOH) and 0.3 ml. 5 N acetic acid. The alkaline sulfite and acetic acid are added exactly 2 minutes after the iodine and alkaline sulfite, respectively. The solution is heated in a boiling water bath for 5 minutes; then the tube is cooled in cool water. Fluorescence is determined at 385/510 mμ (norepinephrine). By this procedure, average recovery of norepinephrine added to brain tissue is 51.3 percent, and of the amine added to hearts is 56.7 percent.

B. *Effect of d-α-methyltyrosine upon the potency of catecholamine depletors.*—The dose of d-α-methyltyrosine was kept constant at zero or 30 mg./kg., while the dose of 1 - α - methyl - m - tyrosine or of 6-hydroxydopamine was varied.

Table IA shows that the $ED_{50}$ for 1-α-methyl-m-tyrosine in depleting the brain of norepinephrine was decreased from 18.24 mg./kg. to 5.14 mg./kg. by the concomitant administration of 30 mg./kg. of d-α-methyltryrosine.

Table IB shows that the $ED_{50}$ for 6-hydroxydopamine in depleting the brain of norepinephrine was decreased from 2.97 mg./kg. to 1.80 mg./kg. by the concomitant administration of 30 mg./kg. of d-α-methyltryrosine.

In both of these tables, the fact that the slope of the dose-response curves were not significantly changed by the coadministration of d-α-methyltyrosine with the depleting agents shows that at all doses of the depleting agents, including minimal effective doses, the potentiating effect of d-α-methyltyrosine was evident.

TABLE I.—EFFECT OF d-α-METHYLTYROSINE (AMT) UPON THE POTENCY OF CATECHOLAMINE DEPLETORS IN DECREASING TISSUE* NOREPINEPHRINE CONCENTRATION, MEASURED 16 HOURS AFTER DOSING

[A. l-α-Methyl-m-Tyrosine (AMMT)]

| Brain† | Without d-AMT | With d-AMT, 30 mg./kg. |
|---|---|---|
| $ED_{50}$ of l-AMMT (mg./kg.) | **18.24 | ‡5.14 |
| 95% Confidence limits | 11.94, 27.86 | 3.65, 7.24 |
| Slope# | −0.245 | −0.235 |

*Since the heart is more sensitive than brain to the depleting effect of α-methyl-m-tyrosine, at the higher dose used (30 mg./kg.) norepinephrine was depleted over 90% whether or not d-AMT was given. At a dose of 3 mg./kg. l-AMMT, heart norepinephrine was 0.341 of normal (in the absence of d-AMT) or 0.162 of normal (in the presence of d-AMT 30 mg./kg.) s=.032, p for effect of d-AMT <0.001; 9 groups of 5 mice.
†2-dose assay (3 and 30 mg./kg.)
**9 groups of 5 mice.
‡6 groups of 5 mice.
Slope of regression line fraction of normal norepinephrine in tissue on log dose in mg./kg.

[B. 6-Hydroxydopamine (6-HD)]

| Heart | Without d-AMT | With d-AMT‡ |
|---|---|---|
| $ED_{50}$ of 6-HD (mg./kg.) | *2.97 | †1.80 |
| 95% Confidence Limits | 2.72, 3.24 | 1.66, 1.95 |
| Slope** | −0.934 | −1.163 |

*4-point assay. 27 groups of 5 mice.
†3-point assay. 9 groups of 5 mice.
**Slope of regression line, norepinephrine as fraction of normal on log dose, mg./kg.
‡p for effect of d-AMT <0.001.

*Example 2*

VARIATION OF POTENTIATION WITH DOSE OF d-α-METHYLTYROSINE

The procedure of Example 1 is followed using the $ED_{50}$ of each compound for the various tissues when used alone and varying the amounts of d-α-methyltyrosine (d-AMT) coadministered. The catecholamine depletion is then compared to the dose response curve of the depleter when used alone and potentiation is expressed as the multiple of the $ED_{50}$ necessary to be added to the $ED_{50}$ to give this response. The results are in Table II.

TABLE II

| Catecholamine Depletor | Tissue | $ED_{50}$, mg./kg. | Dose d-AMT, mg./kg. | Potentiation* |
|---|---|---|---|---|
| dl-α-Methyl-m-tyrosine | Brain | 25 | 30 | .69 |
|  |  |  | 45 | 1.75 |
|  | Heart | 2 | 30 | 4.09 |
|  |  |  | 45 | 12.88 |
|  |  |  | 60 | 21.73 |
| 6-hydroxydopamine | do | 3 | 30 | .53 |
|  |  |  | 40 | .83 |
|  |  |  | 60 | 1.08 |
| Methyldopa | Brain | 50 | 30 | 1.16 |
|  |  |  | 40 | 1.29 |
|  |  |  | 60 | 1.76 |
|  | Heart | 50 | 30 | 1.46 |
|  |  |  | 40 | 2.21 |
|  |  |  | 60 | 4.21 |

*Multiple of $ED_{50}$ which if added to the $ED_{50}$ would produce the same response as the $ED_{50}$ given with the indicated dose of d-AMT. For example, for dl-α-methyl-m-tyrosine, 25+0.69 (25)=42.25 mg./kg. gives the same response as 25 mg./kg.+30 mg./kg. of d-AMT.

I claim:
1. A method of more effectively depleting catecholamines in mammalian tissues which comprises the coadministration of at least 30 mg./kg., based on the body weight of the mammal, of d-α-methyl-p-tyrosine and at least a minimal effective dose for the tissue to be depleted of a catecholamine depleting compound selected from the group consisting of l or dl-α-methyl-3,4-dihydroxyphenylalanine, l or dl-α-methyl-m-tyrosine and 2-(2,4,5-trihydroxyphenyl)ethylamine.

2. The method of claim 1 in which the catecholamine depleting compound is l or dl-α-methyl-3,4-dihydroxyphenylalanine.

3. The method of claim 1 in which the catecholamine depleting compound is l or dl-α-methyl-m-tyrosine.

4. The method of claim 1 in which the catecholamine depleting compound is 2-(2,4,5-trihydroxyphenyl)ethylamine.

5. A composition for depleting catecholamines in mammalian tissues which comprises:
   (a) d-α-methyl-p-tyrosine;
   (b) a catecholamine depleting compound selected from the group consisting of l or dl-α-methyl-3,4-dihydroxyphenylalanine, l or dl-α-methyl-m-tyrosine and 2-(2,4,5-trihydroxyphenyl)ethylamine;
   (c) the said composition containing at least 30 mg. of said compound (a) and at least a minimal effective dose, expressed in mg./kg., of the said compound (b).

6. The composition of claim 5 in which said compound (b) is l or dl-α-methyl-m-tyrosine.

7. The composition of claim 5 in which said compound (b) is 2-(2,4,5-trihydroxyphenyl)ethylamine.

No references cited.

ALBERT T. MEYERS, *Primary Examiner.*
LEROY B. RANDALL, *Assistant Examiner.*